(12) United States Patent
Hong

(10) Patent No.: US 10,242,304 B1
(45) Date of Patent: *Mar. 26, 2019

(54) CONTACTLESS DATA CARRIER

(71) Applicant: YOKE INDUSTRIAL CORP., Taichung (TW)

(72) Inventor: Rong-Der Hong, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/826,987

(22) Filed: Nov. 30, 2017

(30) Foreign Application Priority Data

Sep. 20, 2017 (TW) .............................. 106132292 A

(51) Int. Cl.
*G06K 19/077* (2006.01)
(52) U.S. Cl.
CPC .............................. *G06K 19/07749* (2013.01)
(58) Field of Classification Search
CPC ... Y10T 70/5004; Y10T 24/50; E05B 73/001; G06K 19/07749
See application file for complete search history.

(56) References Cited

U.S. PATENT DOCUMENTS

2009/0078762 A1* 3/2009 Forster ................. A01K 11/001
235/385

FOREIGN PATENT DOCUMENTS

CN  205068470 U  3/2016
EP  2508461 B1  3/2016

OTHER PUBLICATIONS

English Abstract of EP2508461, Total of 1 page.
Examination Report for TW106132292, dated Mar. 27, 2018, Total pages of 6.
Search Report for TW106132292, dated Mar. 27, 2018, Total page of 1.
English Abstract for CN205068470 (U), Total of 1 page.
Examination Report for TW106132292, dated Mar. 19, 2018, Total pages of 6.
Search Report for TW106132292, dated Mar. 16, 2018, Total page of 1.

* cited by examiner

*Primary Examiner* — Sonji N Johnson
(74) *Attorney, Agent, or Firm* — Lynette Wylle; Apex Juris, pllc.

(57) ABSTRACT

A contactless data carrier which is adapted to be disposed in a receiving portion of an object connection device includes a base and a tag member. The base is adapted to be tucked into the receiving portion, and has a top and a bottom, which are opposite to each other. An outer peripheral surface of the base forms a plurality of annular projections arranged at regular intervals in a direction from the top toward the bottom. An outer peripheral surface of each of the annular projections is adapted to abut against an inner surface of the receiving portion. The tag member disposed at the base is stored with data relative to the object connection device to be read in a contactless manner by a reading device and the outer peripheral surface of the base could allow the contactless data carrier to be firmly tucked into the receiving portion.

13 Claims, 12 Drawing Sheets

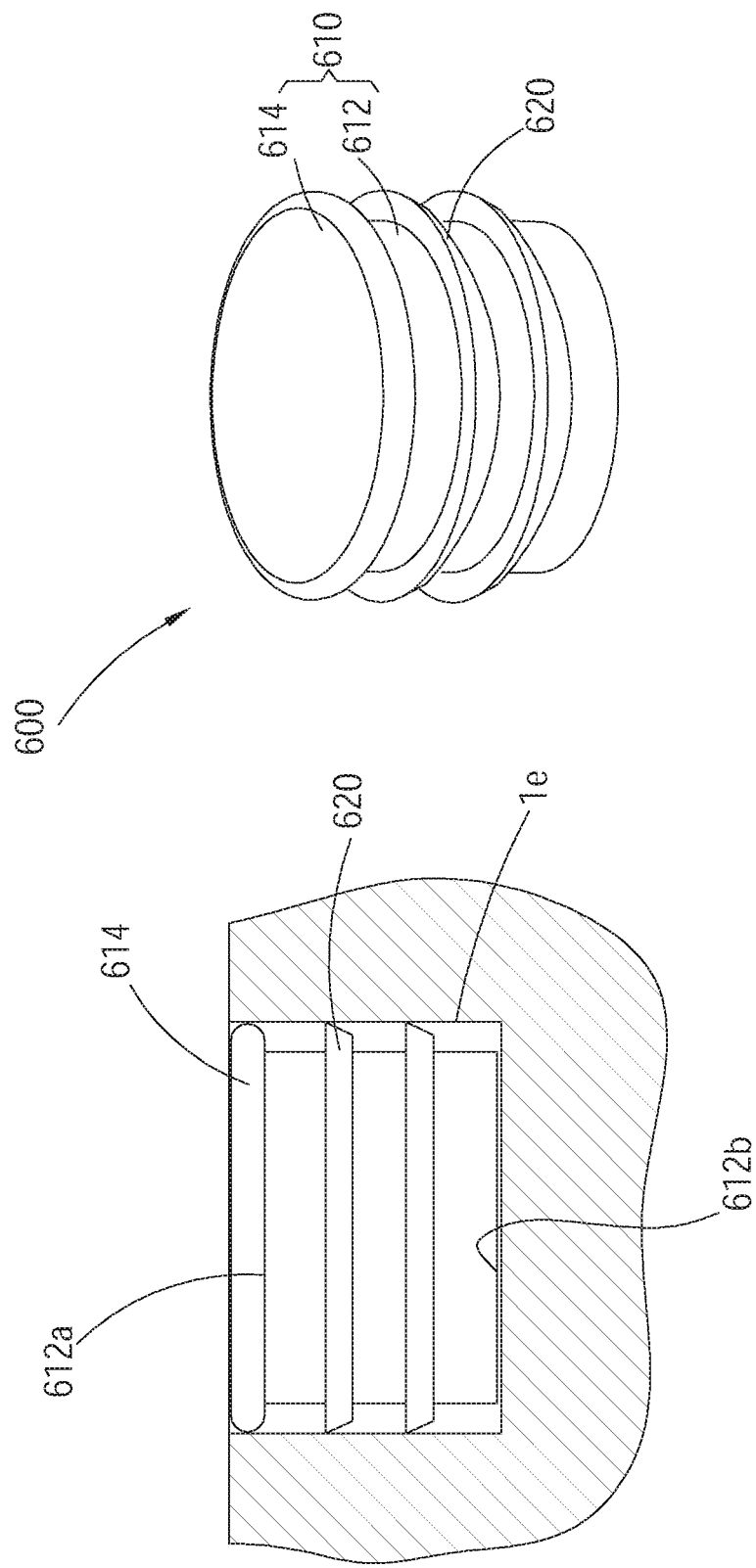

CONTACTLESS DATA CARRIER

BACKGROUND OF THE INVENTION

1. Technical Field

The present invention relates generally to a contactless data carrier, and more particularly to a contactless data carrier, which is disposed at an object connection device, and data of the object connection device stored in the contactless data carrier is adapted to be read in a contactless manner by a reading device.

2. Description of Related Art

Common object connection devices include connecting rings, shackles, pull rings, rope sockets, snatch blocks, hoist rings, swivels, swivel hoist rings, eye bolts, bearing swivels, hooks, buckles, connecting links, chains, ratchets, etc. The object connection devices are typically used to fix, lift, or tie goods or equipment, wherein each of the object connection devices has different models, sizes, mechanical properties, manufacturers, manufacturing dates, critical loads, service lives, maintenance processes, other related information, etc.

For safety, users must be familiar with the relevant information of each of the object connection devices. However, in practice, it is clearly difficult for users to bear the relevant information of various object connection devices in mind. In light of this, a load bearer with the contactless readable data carrier, which is similar to the aforementioned object connection devices, is disclosed in EP 2508461 B1, which allows the user to read the data stored on the data carrier to learn about the relevant information of the load bearer.

As shown in FIG. 21 in EP 2508461 B1, the data carrier 14 is fixed by generating friction between a load-receiving part 1 and retaining ribs 23. However, the retaining ribs 23 extends in a direction perpendicular to a surface 22, wherein such direction is parallel to the force that enables the data carrier 14 to be disengaged from the load-receiving part 1. In light of this, the way that the data carrier 14 in EP 2508461 B1 being fixed is not firm, so that the data carrier 14 may disengage from the load-receiving part 1. In all aspects, the conventional data carrier still has room for improvements.

BRIEF SUMMARY OF THE INVENTION

In view of the above, the primary objective of the present invention is to provide a contactless data carrier, which could be firmly fixed at an object connection device, and would not easily disengage therefrom.

The present invention provides a contactless data carrier, which is adapted to be disposed in a receiving portion of an object connection device, including a base and a tag member, wherein the base adapted to be tucked into the receiving portion, wherein the base has a top and a bottom, which are opposite to each other; a plurality of annular projections is formed on an outer peripheral surface of the base, and the annular projections are arranged at regular intervals in a direction from the top toward the bottom. An outer peripheral surface of each of the annular projections is adapted to abut against an inner surface of the receiving portion. The tag member is disposed at the base, wherein the tag member is stored with a piece of data relative to the object connection device. The tag member is adapted to be read in a contactless manner by a reading device.

With the aforementioned design, the outer peripheral surface of the base could firmly abut against the inner surface of the receiving portion of the object connection device, so that the contactless data carrier would not easily disengage therefrom.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 8 is a perspective view of the contactless data carrier of a sixth embodiment of the present invention;

FIG. 9 is a schematic diagram, showing the contactless data carrier of the sixth embodiment is tucked into the receiving portion;

DETAILED DESCRIPTION OF THE INVENTION

Figure 1:
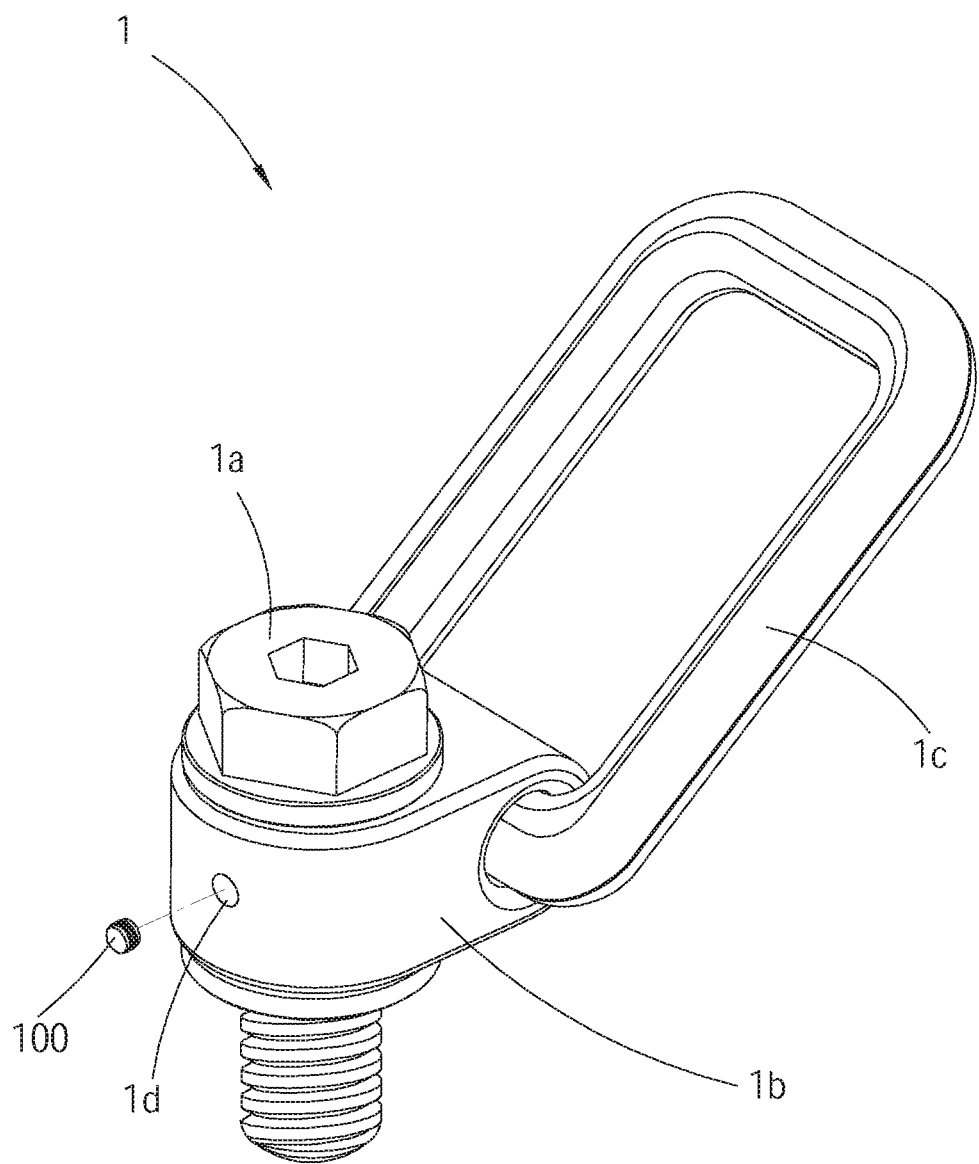
FIG. 1 is a perspective view of the object connection device and the contactless data carrier of a first embodiment of the present invention.

A contactless data carrier 100 of a first embodiment of the present invention and an object connection device which is a side-pull hoist ring 1 as an example are illustrated in FIG. 1, wherein the side-pull hoist ring 1 includes a bolt 1a, an engaging member 1b, and a bail 1c. The engaging member 1b is engaged with the bolt 1a, and the bail 1c is pivotally engaged with the engaging member 1b, wherein a receiving portion, which is a blind hole 1d as an example, is disposed on a side surface of the engaging member 1b.

Figure 2:
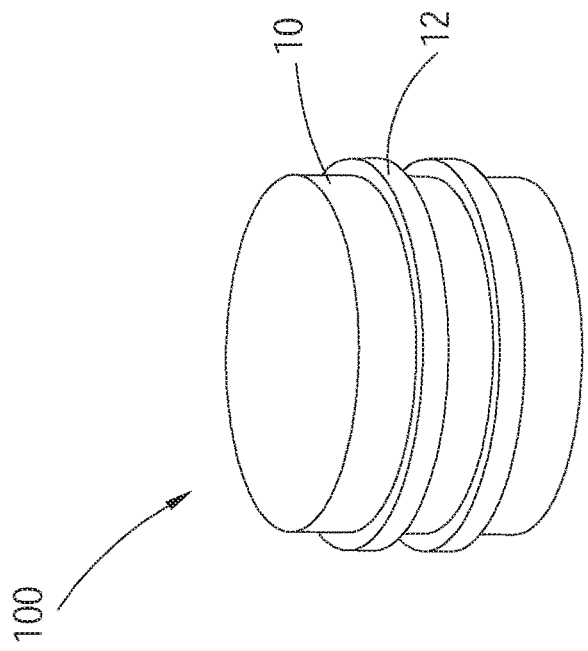
FIG. 2 is a perspective view of the contactless data carrier of the first embodiment.
Figure 3:
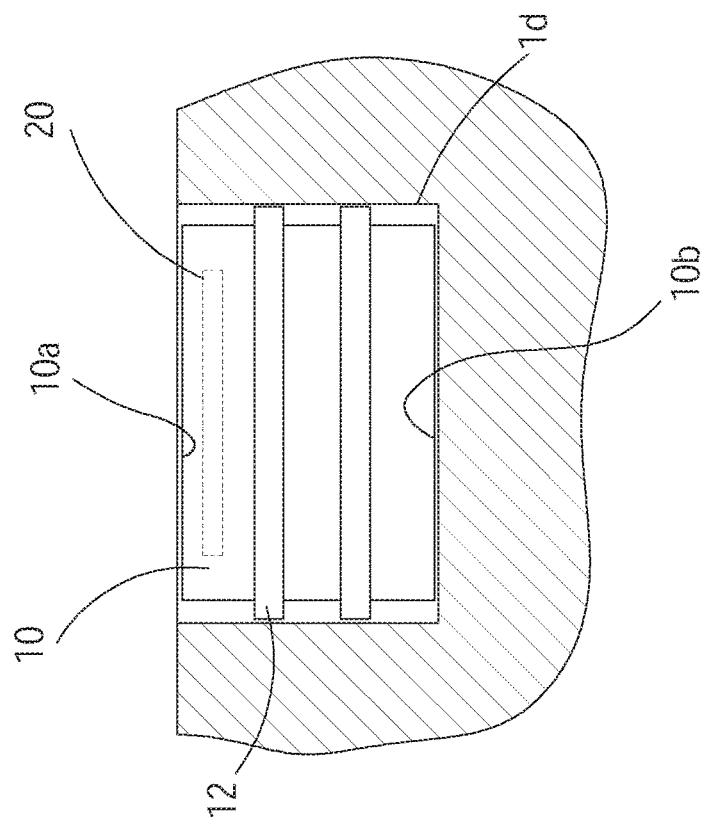
FIG. 3 is a schematic diagram, showing the contactless data carrier of the first embodiment is tucked into the receiving portion.

As shown in FIG. 2 and FIG. 3, the contactless data carrier 100 includes a base 10 and a tag member 20, wherein the base 10 is adapted to be tucked into the blind hole 1*d* of the side-pull hoist ring 1. The base 10 has a top 10*a* and a bottom 10*b*, which are opposite to each other. A plurality of annular projections 12 is formed on an outer peripheral surface of the base 10, wherein the annular projections 12 are arranged at regular intervals in a direction from the top 10*a* toward the bottom 10*b*. An outer peripheral surface of each of the annular projections 12 is adapted to abut against an inner surface of the blind hole 1*d*.

In the current embodiment, the base 10 is made of an elastic material, such as rubber, silicone, or other polymer materials. However, the material of the base is not a limitation of the present invention. In other embodiments, the base could be made of others elastomer, such as Thermoplastic Elastomer (TPE). Preferably, the base could be made of insulating materials. The advantage of using the elastic material is that when the base 10 is tucked into the blind hole 1*d*, the annular projections 12 is pressed to be elastically deformed, so that the contact pressure between the annular projections 12 and the inner surface of the blind hole 1*d* would be increased, especially the contact pressure in normal. Whereby, providing a tight performance between the base 10 and the blind hole 1*d*. In addition, in an embodiment, the outer peripheral surface of each of the annular projections 12 is a convex surface, so that when the annular projections 12 is deformed, the outer peripheral surface of each of the annular projections 12 could abut against an inner surface of the blind hole 1*d* much closely. However, the shape of the outer peripheral surface of each of the annular projections is not a limitation of the present invention. In other embodiments, the outer peripheral surface of each of the annular projections could be a rough surface, such as a zigzag surface, which is facilitated to tightly engage the annular projections 12 and the blind hole 1*d*.

The tag member 20 is disposed at the base 10, and is stored with data of the side-pull hoist ring 1, such as models, mechanical properties, manufacturers, manufacturing date, critical load, service life, maintenance process, etc., wherein the stored data could be read in a contactless manner by a reading device (not shown) which is operable by a user. In an embodiment, the data stored in the tag member 20 could be a code, wherein the code is read by the reading device, and the corresponding data in a database could be retrieved according to the code, whereby to obtain the data of the corresponding object connection device.

In the current embodiment, the tag member 20 is a passive RFID (Radio Frequency Identification) electronic tag, and the reading device is an RFID reader, wherein the RFID reader is operable by the user to read the data stored in the RFID electronic tag. It is worth mentioning that, the data stored in the tag member 20 could be modified and stored again. For instance, the tag member 20 could be updated and stored with the data of the maintenance process again by the user when the side-pull hoist ring 1 is maintained or repaired.

However, the tag member 20 is not limited to be the passive RFID electronic tag, but could be semi-passive or active RFID electronic tags, or other equivalent structures, such as NFC electronic tags, ferrite NFC electronic tags, etc. In addition, in the current embodiment, the tag member 20 is disposed inside the base 10, which could prevent the tag member 20 from being polluted by foreign matters. However, the disposition of the tag member 20 is not a limitation of the present invention. In other embodiments, the tag member 20 could be disposed on an outer surface of the base 10.

Figure 4:
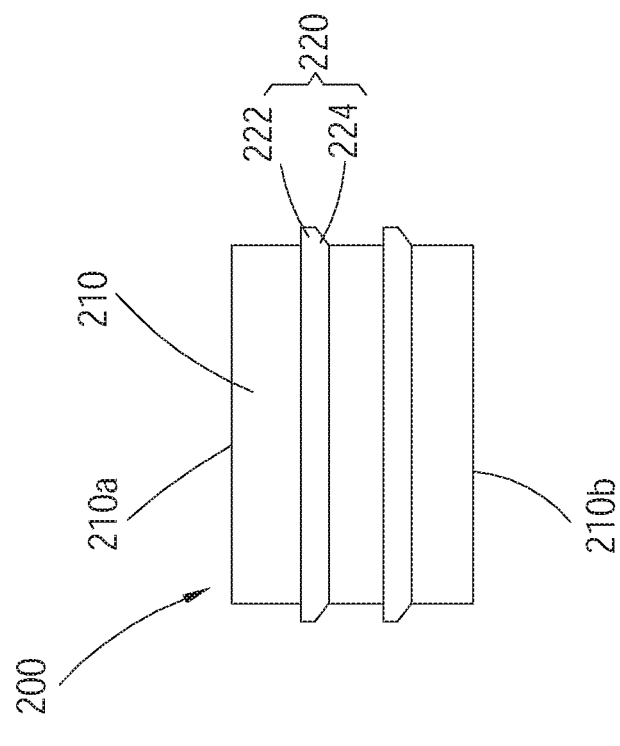
FIG. 4 is a side view of the contactless data carrier of a second embodiment of the present invention.

As illustrated in FIG. 4, a contactless data carrier 200 of a second embodiment of the present invention has almost the same structure as that of the first embodiment, except that a plurality of annular projections 220 of a base 210 includes an upper section 222 and a lower section 224, which are connected to each other. The upper section 222 is closer to a top 210*a* of the base 210 than the lower section 224. The upper section 222 has a consistent width. In other words, an outer peripheral surface of the upper section 222 is a cylindrical surface, which is flat in a side view. Whereby, when the contactless data carrier 200 is tucked into the receiving portion, the design of the lower section 224 could facilitate to guide the contactless data carrier 200 into the receiving portion, and the outer peripheral surface of the upper section 222 could firmly abut against the inner surface of the receiving portion.

Figure 5:
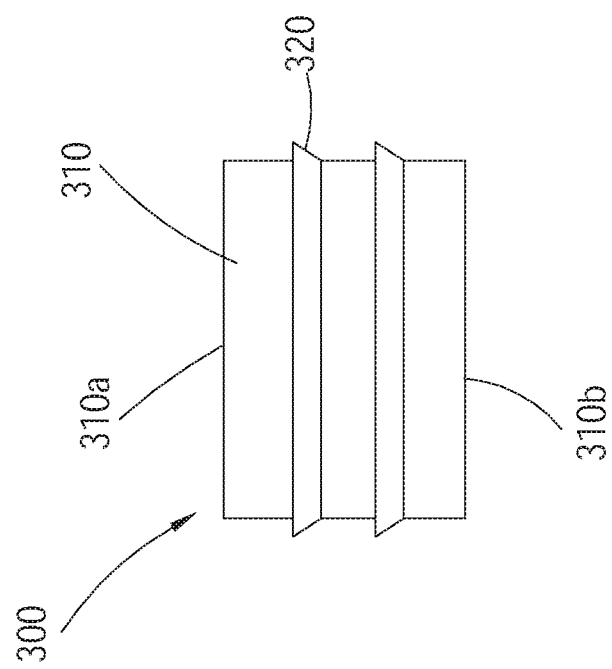
FIG. 5 is a side view of the contactless data carrier of a third embodiment of the present invention.

As illustrated in FIG. 5, a contactless data carrier 300 of a third embodiment of the present invention has almost the same structure as that of the aforementioned embodiments, except that a width of a plurality of annular projections 320 of a base 310 decreases gradually in a direction from a top 310*a* toward a bottom 310*b* of the base 310. For instance, an outer peripheral surface of the annular projections 320 is a conical surface, which is inclined in a side view. Whereby, the contactless data carrier 300 is facilitated to be guided into the receiving portion. It is worth mentioning that, when the annular projections 320 is pressed by the inner surface of the receiving portion to be deformed, the outer peripheral surface of the annular projections 320 could abut against the inner surface of the receiving portion much closely.

Figure 6:
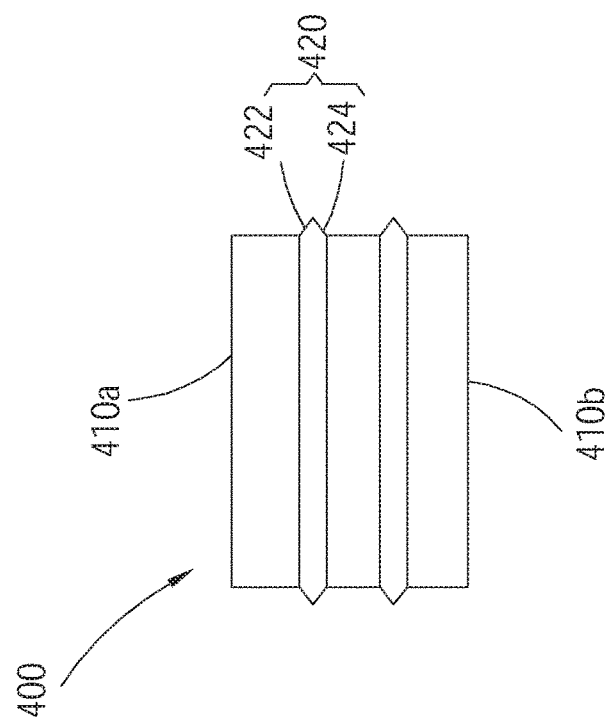
FIG. 6 is a side view of the contactless data carrier of a fourth embodiment of the present invention.

As illustrated in FIG. 6, a contactless data carrier 400 of a fourth embodiment of the present invention has almost the same structure as that of the aforementioned embodiments, except that a plurality of annular projections 420 of a base 410 include an upper section 422 and a lower section 424, which are connected to each other. The upper section 422 is closer to a top 410*a* of the base 410 than the lower section 424. A width of the upper section 422 decreases gradually in a direction toward the top 410*a*, and a width of the lower section 424 decreases gradually in a direction toward a bottom 410*b* of the base 410. With the aforementioned design, the contactless data carrier 400 is facilitated to be guided into the receiving portion. In addition, the outer peripheral surfaces of a junction of the upper section 422 and the lower section 424 could tightly abut against the receiving portion.

Figure 7:
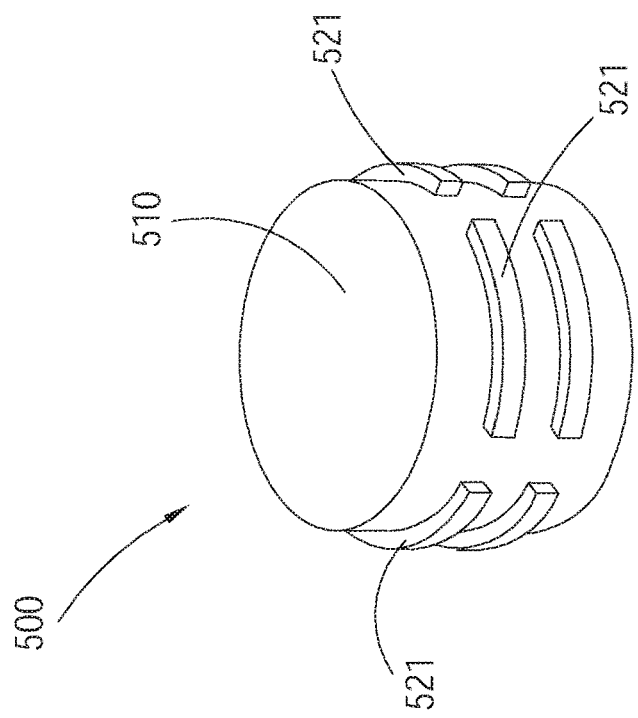
FIG. 7 is a perspective view of the contactless data carrier of a fifth embodiment of the present invention.

As illustrated in FIG. 7, a contactless data carrier 500 of a fifth embodiment of the present invention has almost the same structure as that of the aforementioned embodiments, except that a plurality of annular projections has a plurality of projecting sections 521 arranged at regular intervals in a circumferential direction of a base 510. Whereby, when the contactless data carrier 500 is tucked into the receiving portion, air in the receiving portion could be exhausted via gaps between the projecting sections 521, and the contactless data carrier 500 could be firmly positioned in the receiving portion.

However, the number of the annular projections is not limited to be two as exemplified above, but could be three or more than three. In addition, the annular projections in the aforementioned embodiments could be applied to one another. For instance, a contactless data carrier has a plurality of annular projections, and the structure of each of the annular projections is slightly different (e.g. at least one of the annular projections has the same structure as the annular projections 220 of the second embodiment, at least one of the annular projections has the same structure as the annular projections 320 of the third embodiment, at least one of the annular projections has the same structure as the annular projections 420 of the fourth embodiment, and at least one of the annular projections has the same structure as the annular projections of the fifth embodiment).

As illustrated in FIG. 8 and FIG. 9, a contactless data carrier 600 of a sixth embodiment of the present invention has almost the same structure as that of the aforementioned embodiments, and is based on the third embodiment, except that a base 610 includes a body 612 and a head 614, wherein the body 612 has a plurality of annular projections 620, a top 612a, and a bottom 612b. The head 614 is connected to the top 612a of the body 612, and a maximum width of the head 614 is smaller than a maximum width of the annular projections 620. In the current embodiment, the maximum width of the head 614 is substantially equal to the maximum width of the annular projections 620. An outer peripheral surface of the head 614 is a convex surface, and is adapted to abut against the inner surface of the receiving portion of the object connection device. With the aforementioned design, when the contactless data carrier 600 is tucked into the receiving portion of the object connection device, not only an outer peripheral surface of the annular projections 620 but also the outer peripheral surface of the head 614 could abut against an inner surface 1e of the receiving portion, whereby the contactless data carrier 600 could be firmly positioned. It is worth mentioning that, the advantage of using the convex surface on the outer peripheral surface of the head 614 is that, the influence of the manufacturing tolerance is reduced, and the outer peripheral surface of the head 614 could be kept in good contact with the inner surface 1e. In a situation that a part of the head 614 (e.g. one-third of the head 614 in a vertical direction) is exposed out of the receiving portion, when the head 614 is pressed by an external force from an opening of the receiving portion, the convex surface of the head 614 is facilitated to guide the contactless data carrier 600 to move toward an inside of the receiving portion.

Figure 10:
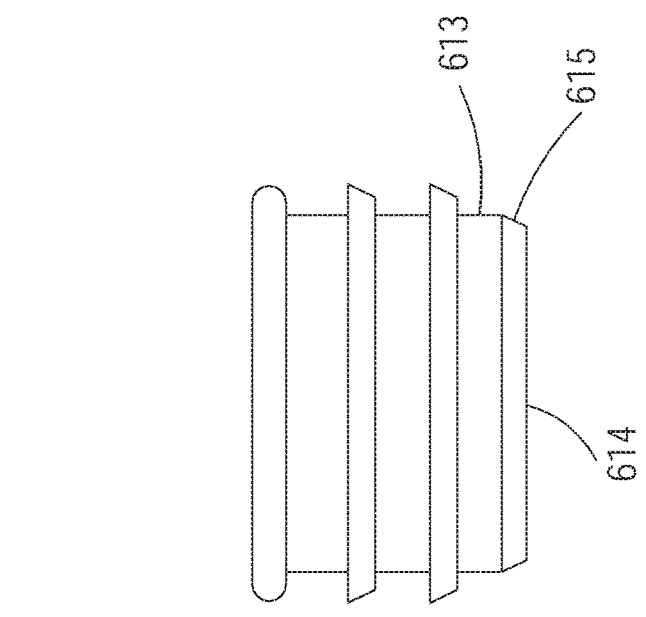
FIG. 10 is a side view of the contactless data carrier of a seventh embodiment of the present invention.

As illustrated in FIG. 10, a contactless data carrier 600' of a seventh embodiment of the present invention has almost the same structure as that of the sixth embodiment, except that a chamfer 615 is formed at a junction of an outer peripheral surface 613 and a bottom 614 of a body. Whereby, the contactless data carrier 600' could be facilitated to be guided into the receiving portion when the contactless data carrier 600' is tucked into the receiving portion with the bottom 614 facing the receiving portion.

Figure 11:
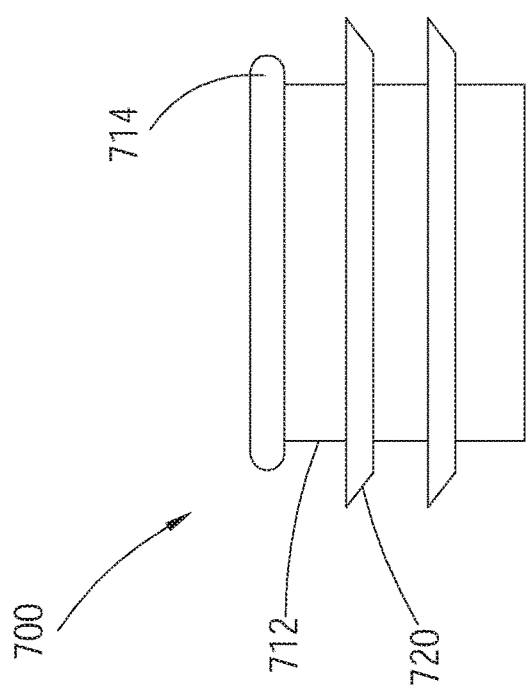
FIG. 11 is a side view of the contactless data carrier of an eighth embodiment of the present invention.

As illustrated in FIG. 11, a contactless data carrier 700 of an eighth embodiment of the present invention has almost the same structure as that of the sixth embodiment, except that a maximum width of a body 712 (i.e., a maximum width of annular projections 720) is greater than a maximum width of a head 714, wherein a material of the body 712 could be low-hardness, whereby when the contactless data carrier 700 is tucked into the receiving portion of the object connection device, the annular projections 720 on the body 712 could be deformed to a larger extent, so as to abut against the inner surface of the receiving portion much closely, providing a better positioning performance.

Figure 12:
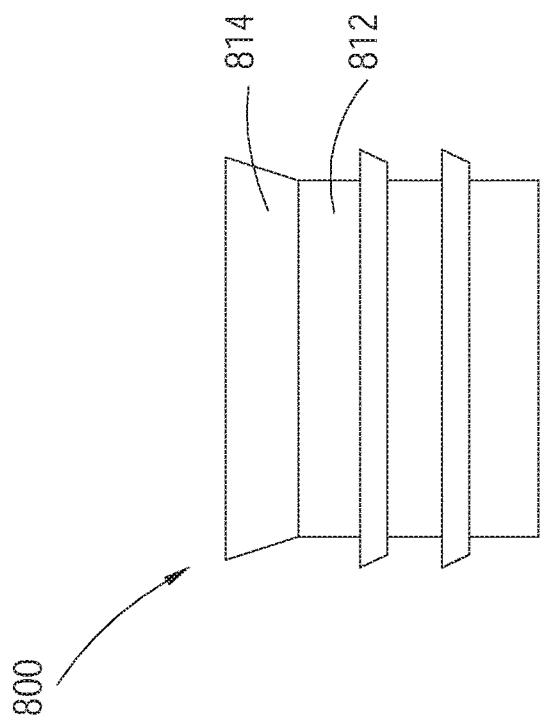
FIG. 12 is a side view of the contactless data carrier of a ninth embodiment of the present invention.

As illustrated in FIG. 12, a contactless data carrier 800 of a ninth embodiment of the present invention has almost the same structure as that of the sixth embodiment, except that a width of a head 814 decreases gradually in a direction toward a body 812. Whereby, the contactless data carrier 800 is facilitated to be guided into the receiving portion of the object connection device. In the current embodiment, an outer peripheral surface of the head 814 is a conical surface, which is inclined in a side view. However, the outer peripheral surface of the head is not limited to be a conical surface as exemplified above, but could be a zigzag surface or a curved surface (e.g. convex surface or concave surface).

Figure 13:
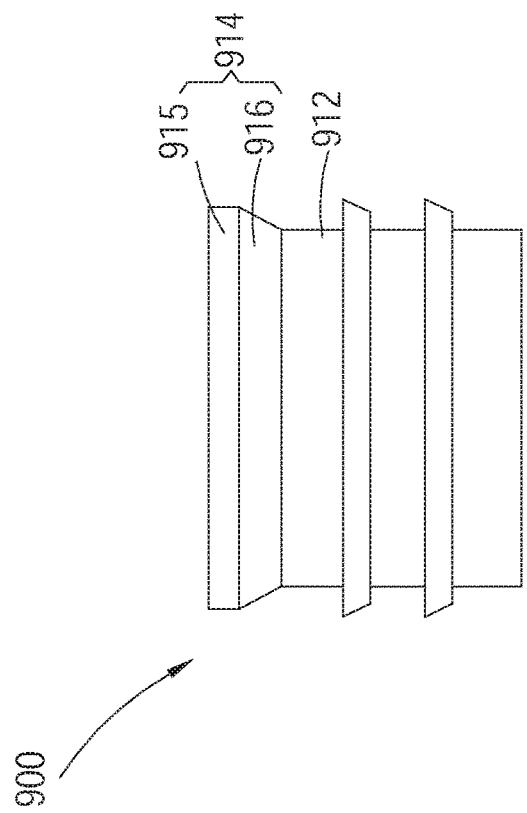
FIG. 13 is a side view of the contactless data carrier of a tenth embodiment of the present invention.

As illustrated in FIG. 13, a contactless data carrier 900 of a tenth embodiment of the present invention has almost the same structure as that of the sixth embodiment, except that a head 914 includes a first portion 915 and a second portion 916, which are connected to each other, wherein the first portion 915 has a substantially consistent width, and an outer peripheral surface of the first portion 915 could be a flat surface or a zigzag surface. The second portion 916 is located between the first portion 915 and a body 912, and is connected to a top of the body 912, wherein a width of the second portion 916 decreases gradually in a direction toward the body 912. In this way, an outer peripheral surface of the second portion 916 is facilitated to guide the contactless data carrier 900 into the receiving portion of the object connection device, and the outer peripheral surface of the first portion 915 is facilitated to fix the contactless data carrier 900 within the inner surface of the receiving portion by a tightly abutting manner.

Figure 14:
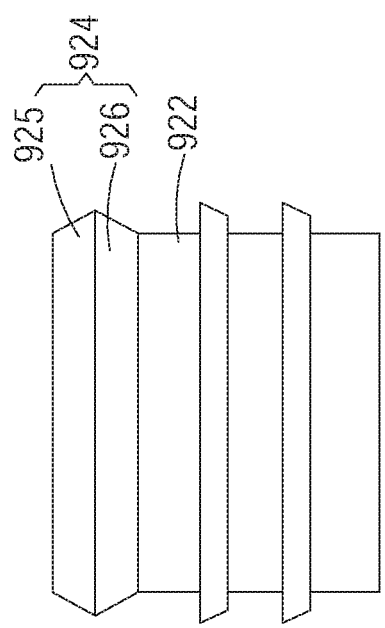
FIG. 14 is a side view of the contactless data carrier of an eleventh embodiment of the present invention.

As illustrated in FIG. 14, a contactless data carrier 920 of an eleventh embodiment of the present invention has almost the same structure as that of the sixth embodiment, except that a head 924 has a first portion 925 and a second portion 926, which are connected to each other, wherein the second portion 926 is located between the first portion 925 and a body 922, and a width of the second portion 926 decreases gradually in a direction toward the body 922. A width of the first portion 925 decreases gradually in a direction away from the second portion 926. In the current embodiment, both an outer peripheral surface of the first portion 925 and an outer peripheral surface of the second portion 926 are conical surfaces, which are inclined in a side view. However, the outer peripheral surface of the head 924 is not limited to be conical surface as exemplified above, but could be a curved surface or a zigzag surface. With the aforementioned design, the contactless data carrier 920 is facilitated to be guided into the receiving portion of the object connection device. In addition, the outer peripheral surfaces of a junction of the first portion 925 and the second portion 926 could tightly abut against the receiving portion. Moreover, when the head 924 is pressed by an external force, the surface of the first portion 925 is facilitated to guide the contactless data carrier 920 to move toward an inside of the receiving portion, and the contactless data carrier 920 would not easily disengage from the receiving portion.

Figure 15:
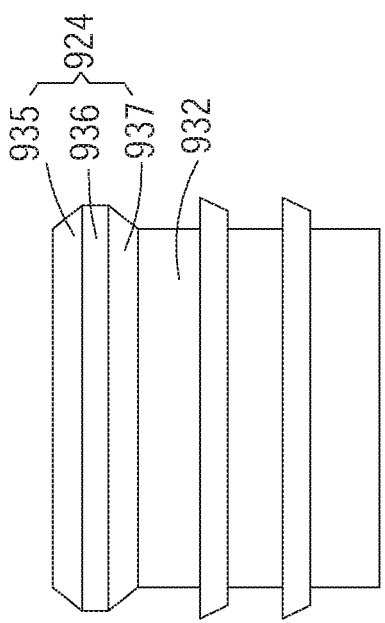
FIG. 15 is a side view of the contactless data carrier of a twelfth embodiment of the present invention.

As illustrated in FIG. 15, a contactless data carrier 930 of a twelfth embodiment of the present invention has almost the same structure as that of the sixth embodiment, except that a head 934 has a first portion 935, a second portion 936, and a third portion 937, which are connected to one another, wherein the second portion 936 is located between the first portion 935 and the third portion 937, and the third portion 937 is located between the second portion 936 and a body 932. A width of the first portion 935 decreases gradually in a direction away from the second portion 936, and a width of the third portion 937 decreases gradually in a direction toward the body 932. In the current embodiment, the second portion 936 has a consistent width. However, the width of the second portion is not a limitation of the present invention. In other embodiments, an outer peripheral surface of the second portion 936 could be a convex surface, a concave surface, or a zigzag surface. Preferably, a maximum width of the second portion 936 is smaller than or equal to a maximum width of the annular projections. With the aforementioned design, it is not only facilitated to guide the contactless data carrier 930 into the receiving portion of the object connection device, but also facilitated to use the second portion 936 to fix the contactless data carrier 930 within the inner surface of the receiving portion by a tightly abutting manner. In addition, with the first portion 935, it is facilitated to prevent the contactless data carrier 930 from being disengaged from the receiving portion when an external force is applied thereon.

Figure 16:
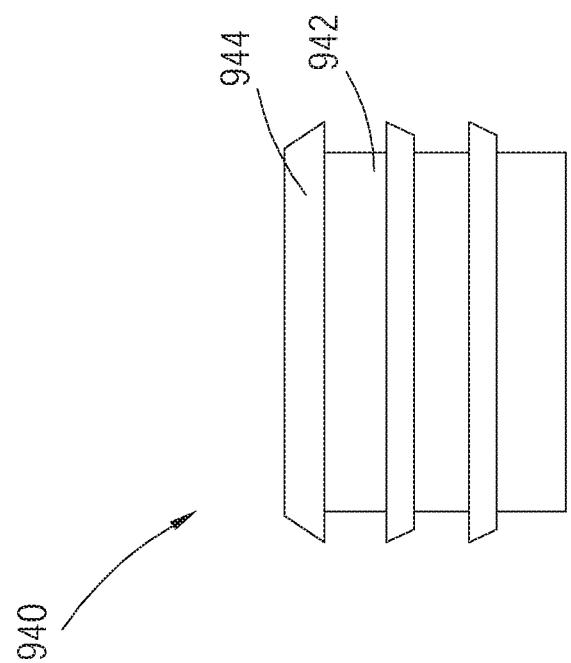
FIG. 16 is a side view of the contactless data carrier of a thirteenth embodiment of the present invention.

As illustrated in FIG. 16, a contactless data carrier 940 of a thirteenth embodiment of the present invention has almost the same structure as that of the sixth embodiment, except that a width of a head 944 increases gradually in a direction toward a body 942. For instance, an outer peripheral surface of the head 944 could be a conical surface. Preferably, a maximum width of the head 944 is substantially equal to a maximum width of the body 942 or a maximum width of the annular projections. Whereby, the outer peripheral surface of the head 944 could firmly abut against the inner surface of the receiving portion. When the head 944 is pressed by an external force, the conical surface of the outer peripheral surface of the head 944 is facilitated to guide the contactless data carrier 940 to move toward an inside of the receiving portion, and the contactless data carrier 940 would not easily disengage from the receiving portion.

As illustrated in FIG. 17 to FIG. 22, the contactless data carriers of the present invention are tucked into different types of the object connection devices, each of which has a receiving portion disposed at a different position thereon. The contactless data carriers shown in FIG. 17 to FIG. 22 could be anyone contactless data carrier of the first to thirteenth embodiments. In order to illustrate easily, the contactless data carrier 600 of the sixth embodiment is used for illustration.

Figure 17:
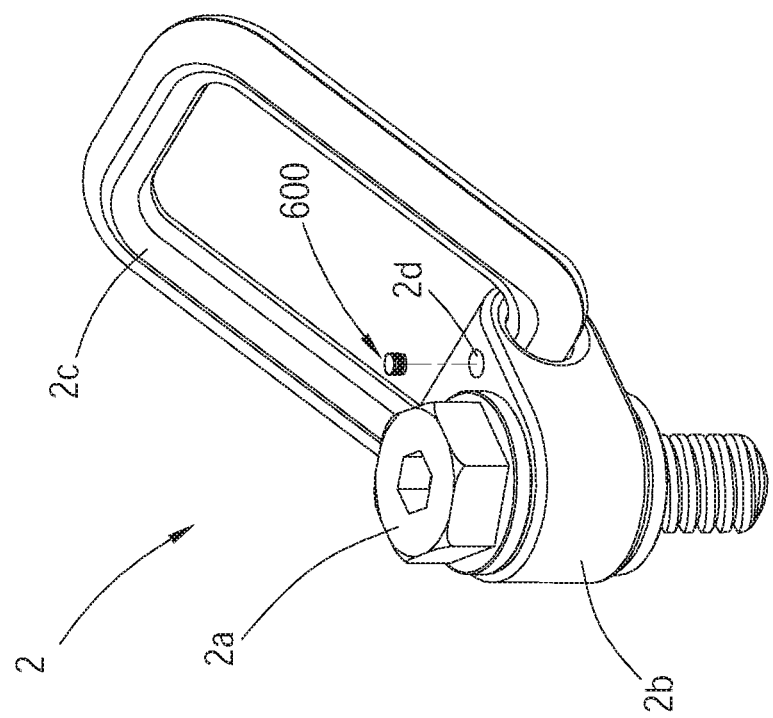
FIGS. 17-22 are schematic diagrams, showing the contactless data carrier of the present invention is respectively tucked into variously oriented types of the receiving portions.

As shown in FIG. 17, the contactless data carrier 600 is applied to an object connection device 2, which is also a side-pull hoist ring as the aforementioned design, wherein the side-pull hoist ring includes a bolt 2a, an engaging member 2b, and a bail 2c. A receiving portion 2d is disposed on a top surface of the engaging member 2b, wherein the receiving portion 2d is adapted to be tucked with the contactless data carrier 600. In other embodiments, said receiving portion 2d could be disposed on a top or a side surface of the bolt 2a, or be disposed on a surface of the bail 2c.

Figure 18:
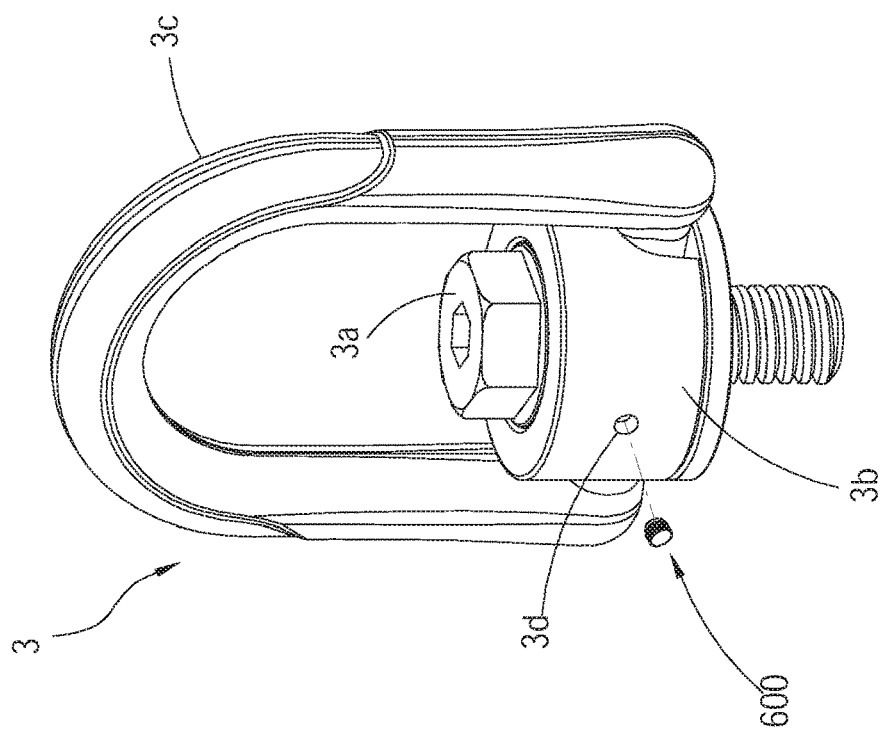

As shown in FIG. 18, the contactless data carrier 600 is applied to an object connection device 3, which is a swivel hoist ring as an example, wherein the swivel hoist ring includes a bolt 3a, an engaging member 3b, and a bail 3c. The engaging member 3b is rotatably engaged with the bolt 3a, and the bail 3c is pivotally connected to the engaging member 3b. A receiving portion 3d is disposed on an outer peripheral surface of the engaging member 3b, wherein the receiving portion 3d is adapted to be tucked with the contactless data carrier 600. In other embodiments, said receiving portion 3d could be disposed on a top of the engaging member 3b or on a surface of the bolt 3a.

Figure 19:
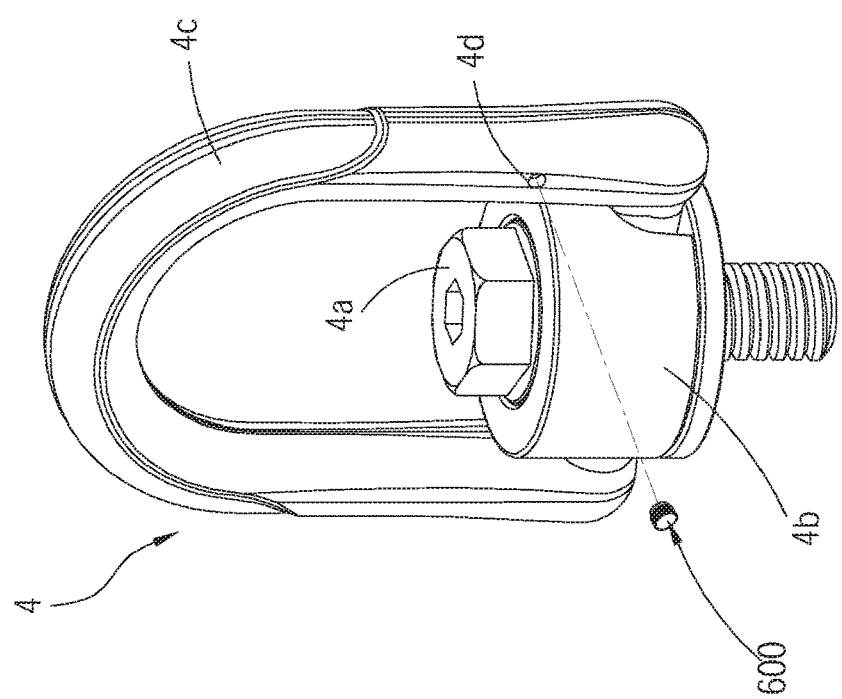

As shown in FIG. 19, the contactless data carrier 600 is applied to an object connection device 4, which is also a swivel hoist ring as an example, wherein the swivel hoist ring includes a bolt 4a, an engaging member 4b, and a bail 4c. A receiving portion 4d is disposed on the bail 4c. In an embodiment, said receiving portion 4d could be disposed on a surface of the bail 4c which is away from the bolt 4a.

Figure 20:
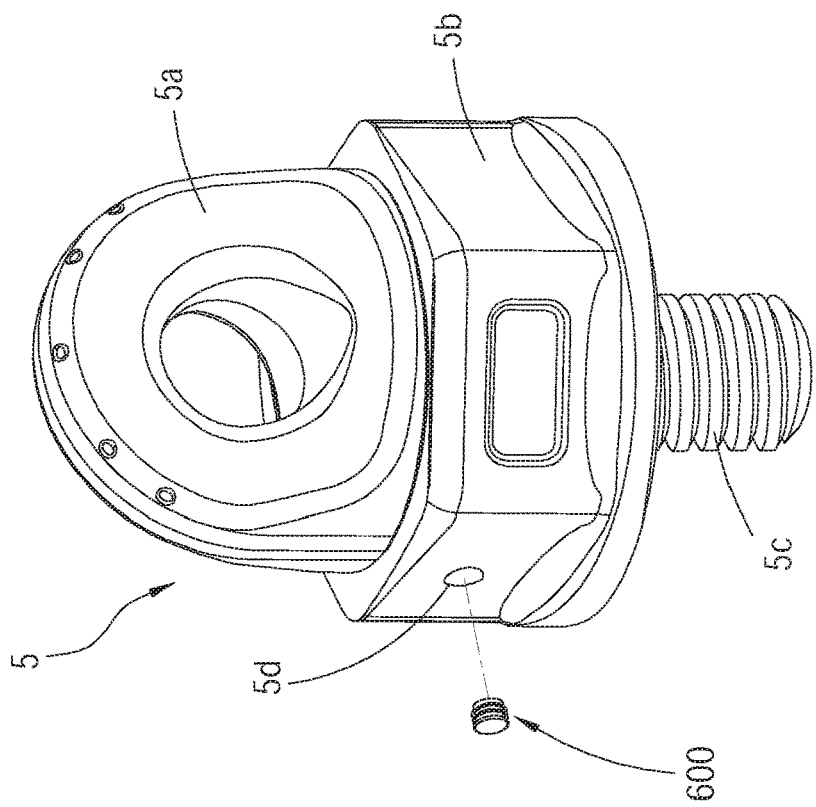

As shown in FIG. 20, the contactless data carrier 600 is applied to an object connection device 5, which is a lifting eye bolt as an example, wherein the lifting eye bolt includes a ring portion 5a, a body 5b, an insertion section 5c, which are connected to one another. The insertion section 5c is adapted to be inserted into an anchor point to be fixed. A receiving portion 5d is disposed on a side surface of the body 5b, wherein the receiving portion 5d is adapted to be tucked with the contactless data carrier 600.

Figure 21:
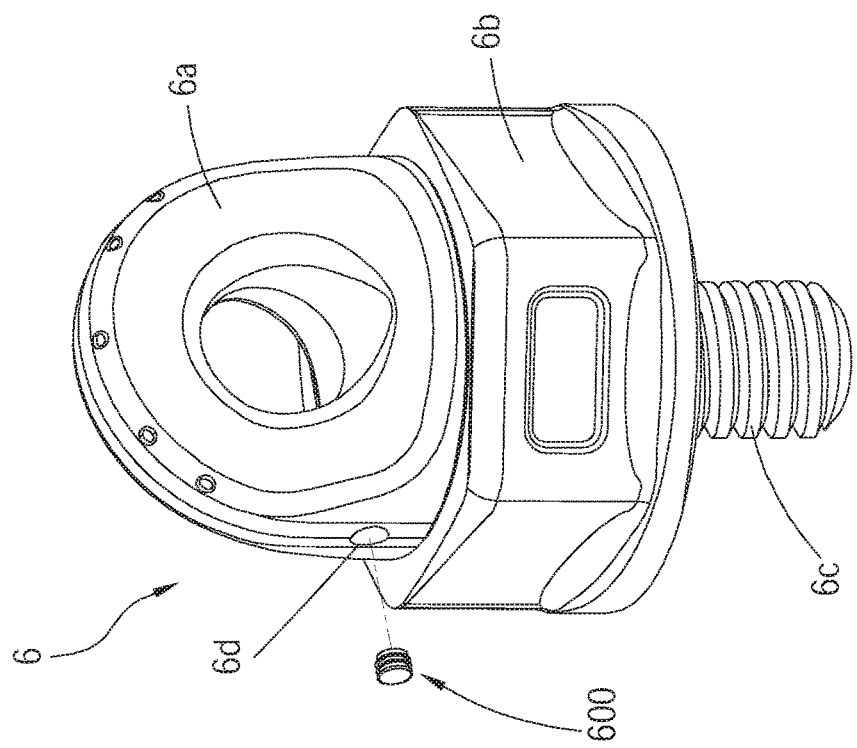

As shown in FIG. 21, the contactless data carrier 600 is applied to an object connection device 6, which is also a lifting eye bolt as an example, wherein the lifting eye bolt includes a ring portion 6a, a body 6b, an insertion section 6c, which are connected to one another. A receiving portion 6d is disposed on a side surface of the ring portion 6a, wherein the receiving portion 6d is adapted to be tucked with the contactless data carrier 400.

Figure 22:
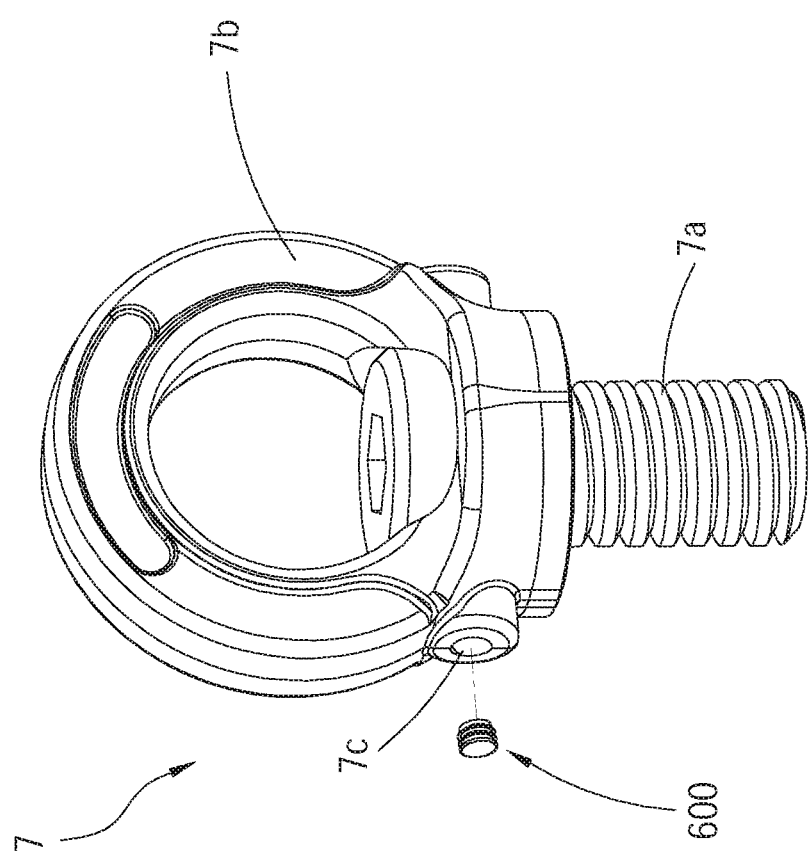

As shown in FIG. 22, the contactless data carrier 600 is applied to an object connection device 7, which is a swivel eye bolt as an example, wherein the swivel eye bolt includes a bolt 7a and a ring 7b, wherein the ring 7b is rotatably engaged with the bolt 7a. A receiving portion 7c is disposed on a side surface of the ring 7b, wherein the receiving portion 7c is adapted to be tucked with the contactless data carrier 600.

However, the receiving portion is not limited to be a blind hole as exemplified above, but could be other equivalent structures, such as perforations, recesses, etc. In addition, the base is not limited to be cylindrical, but could be a polygonal column, a regular polyhedron, etc.

However, the object connection device that the contactless data carrier could be applied to is not limited by the aforementioned design. In other embodiments, the object connection device could include connecting rings, shackles, pull rings, rope sockets, snatch blocks, hoist rings, swivels, swivel hoist rings, eye bolts, bearing swivels, hooks, buckles, connecting links, chains, ratchets, other equivalent types, or have other equivalent structures.

It must be pointed out that the embodiments described above are only some preferred embodiments of the present invention. All equivalent structures which employ the concepts disclosed in this specification and the appended claims should fall within the scope of the present invention.

What is claimed is:

1. A contactless data carrier, comprising:
    a base, which is detachably tucked into a receiving portion of an object connection device, wherein the base has a top and a bottom, which are opposite to each other;
    a plurality of annular projections is formed on an outer peripheral surface of the base, and the annular projections are arranged at regular intervals in a direction from the top toward the bottom; an outer peripheral surface of each of the annular projections is detachably abutted against an inner surface of the receiving portion; and
    a tag member, which is disposed at the base, wherein the tag member is stored with a piece of data relative to the object connection device; the tag member is readable in a contactless manner by a reading device;
    wherein each of the annular projections is a continuous ring and has a lower section; a width of the lower section of at least one of the annular projections decreases gradually in a direction toward the bottom of the base.

2. The contactless data carrier of claim 1, wherein at least one of the annular projections has an upper section, which is connected to the lower section; the upper section is closer to the top of the base than the lower section; the upper section has a consistent width.

3. The contactless data carrier of claim 1, wherein at least one of the annular projections has an upper section, which is connected to the lower section; the upper section is closer to the top of the base than the lower section; a width of the upper section decreases gradually in a direction toward the top of the base.

4. The contactless data carrier of claim 1, wherein the contactless data carrier is tucked into the receiving portion with the bottom of the base facing the receiving portion; a chamfer is formed at a junction of the outer peripheral surface of the base and the bottom of the base.

5. The contactless data carrier of claim 1, wherein the base comprises a body and a head; the body has the annular projections, the top, and the bottom; the head is connected to the top of the body; a maximum width of the head is smaller than or equal to a maximum width of the annular projections.

6. The contactless data carrier of claim 5, wherein the maximum width of the annular projections is greater than the maximum width of the head.

7. The contactless data carrier of claim 5, wherein the maximum width of the annular projections is equal to the maximum width of the head.

8. The contactless data carrier of claim 5, wherein an outer peripheral surface of the head is a convex surface.

9. The contactless data carrier of claim 5, wherein a width of the head decreases gradually in a direction toward the body.

10. The contactless data carrier of claim 5, wherein the head comprises a first portion and a second portion, which are connected to each other; the first portion has a consistent width; the second portion is located between the first portion and the body; a width of the second portion decreases gradually in a direction toward the body.

11. The contactless data carrier of claim 5, wherein the head comprises a first portion and a second portion, which are connected to each other; the second portion is located between the first portion and the body; a width of the second portion decreases gradually in a direction toward the body; a width of the first portion decreases gradually in a direction away from the second portion.

12. The contactless data carrier of claim 5, wherein the head comprises a first portion, a second portion, and a third portion, which are connected to one another; the second portion is disposed between the first portion and the third portion, and the third portion is disposed between the second portion and the body; a width of the first portion decreases gradually in a direction away from the second portion; a width of the third portion decreases gradually in a direction toward the body.

13. The contactless data carrier of claim 1, wherein the base is made of an elastic material.

* * * * *